(12) United States Patent
Hu et al.

(10) Patent No.: US 10,791,103 B2
(45) Date of Patent: Sep. 29, 2020

(54) ADAPTING REMOTE DISPLAY PROTOCOLS TO REMOTE APPLICATIONS

(71) Applicant: VMware, Inc., Palo Alto, CA (US)

(72) Inventors: Jinxing Hu, Beijing (CN); Wei Hu, Beijing (CN); Aaron Hou, Columbus, OH (US); Yuping Wei, Beijing (CN); Tang Jia, Beijing (CN)

(73) Assignee: VMware, Inc., Palo Alto, CA (US)

( * ) Notice: Subject to any disclaimer, the term of this patent is extended or adjusted under 35 U.S.C. 154(b) by 237 days.

(21) Appl. No.: 15/338,269

(22) Filed: Oct. 28, 2016

(65) Prior Publication Data
US 2018/0121030 A1 May 3, 2018

(51) Int. Cl.
*G06F 17/00* (2019.01)
*H04L 29/06* (2006.01)
*H04L 29/08* (2006.01)
*G06F 9/451* (2018.01)

(52) U.S. Cl.
CPC .............. *H04L 63/08* (2013.01); *G06F 9/452* (2018.02); *H04L 67/08* (2013.01); *H04L 67/34* (2013.01)

(58) Field of Classification Search
CPC ......... H04L 63/08; H04L 67/08; H04L 67/34; G06F 9/452; G06F 3/0482; G06F 9/455
USPC .......................................... 717/162; 715/740
See application file for complete search history.

(56) References Cited

U.S. PATENT DOCUMENTS

| | | | | |
|---|---|---|---|---|
| 5,838,916 A * | 11/1998 | Domenikos | ............. | G06F 9/445 709/219 |
| 6,047,312 A * | 4/2000 | Brooks | ................... | G06F 9/465 709/203 |
| 6,836,885 B1 * | 12/2004 | Buswell | ................ | G06F 3/0481 717/172 |
| 8,972,477 B1 * | 3/2015 | Taylor | .................... | G06Q 30/04 709/201 |
| 9,135,052 B2 * | 9/2015 | Luxenberg | .......... | G06F 9/45558 |
| 2004/0102687 A1 * | 5/2004 | Brashears | ............ | A61B 5/0002 600/323 |
| 2005/0246445 A1 * | 11/2005 | Panasyuk | ................ | G06F 21/31 709/227 |
| 2006/0185001 A1 * | 8/2006 | Stieglitz | .................. | H04L 63/20 726/4 |
| 2007/0180450 A1 * | 8/2007 | Croft | ..................... | G06F 3/1415 718/1 |

(Continued)

OTHER PUBLICATIONS

Simoens et al., Design and Implementation of a Hybrid Remote Display Protocol to Optimize Multimedia Experience on Thin Client Devices, IEEE 2008, pp. 391-396. (Year: 2008).*

(Continued)

*Primary Examiner* — Cong-Lac Huynh
(74) *Attorney, Agent, or Firm* — Patterson + Sheridan, LLP

(57) ABSTRACT

A method of connecting to a remote virtual application is carried out at a remote desktop client. The steps of the method include transmitting a request for virtual application connection information, receiving, in response to the request, a path to an executable file, a name or identifier of a remote display protocol, and an indication of a protocol configuration associated with a first virtual application, and causing the executable file for the first virtual application to be launched in a virtual computing instance and accessing the first virtual application using the remote display protocol and the protocol configuration.

20 Claims, 4 Drawing Sheets

(56) References Cited

U.S. PATENT DOCUMENTS

| | | | | |
|---|---|---|---|---|
| 2009/0106347 | A1* | 4/2009 | Harwood | G06F 9/5055 709/203 |
| 2009/0199178 | A1* | 8/2009 | Keller | G06F 9/455 718/1 |
| 2010/0125595 | A1* | 5/2010 | Iizuka | G06F 9/445 707/758 |
| 2010/0198972 | A1* | 8/2010 | Umbehocker | G06F 3/0604 709/226 |
| 2011/0197141 | A1* | 8/2011 | Mazzaferri | G06F 9/542 715/740 |
| 2012/0005237 | A1* | 1/2012 | Obata | G06F 9/45537 707/798 |
| 2013/0212576 | A1* | 8/2013 | Huang | G06F 9/45558 718/1 |
| 2013/0290856 | A1* | 10/2013 | Beveridge | G06F 9/452 715/740 |
| 2014/0040755 | A1* | 2/2014 | Momchilov | G06F 9/54 715/740 |
| 2014/0108665 | A1* | 4/2014 | Arora | H04L 67/141 709/227 |
| 2015/0356773 | A1* | 12/2015 | Kumar | G06F 9/45558 345/520 |
| 2015/0358392 | A1* | 12/2015 | Ramalingam | G06F 16/972 709/203 |
| 2015/0363478 | A1* | 12/2015 | Haynes | G06F 17/30572 707/625 |
| 2015/0378704 | A1* | 12/2015 | Davis | G06F 8/60 709/217 |
| 2016/0006697 | A1* | 1/2016 | Joglekar | H04L 63/20 713/152 |
| 2016/0139948 | A1* | 5/2016 | Beveridge | G06F 9/45558 718/1 |
| 2016/0246560 | A1* | 8/2016 | Petrov | G06F 3/1438 |
| 2016/0248838 | A1* | 8/2016 | AbiEzzi | H04L 67/303 |
| 2016/0285956 | A1* | 9/2016 | AbiEzzi | H04L 67/025 |
| 2016/0352750 | A1* | 12/2016 | Dotan | H04L 63/102 |
| 2016/0371104 | A1* | 12/2016 | Zamir | G06F 9/45533 |
| 2016/0378782 | A1* | 12/2016 | Jiang | G06F 21/6209 726/7 |
| 2016/0379547 | A1* | 12/2016 | Okada | G09G 5/14 345/428 |
| 2017/0003995 | A1* | 1/2017 | Hu | G06F 9/45558 |
| 2017/0041398 | A1* | 2/2017 | Kumar | H04L 67/14 |
| 2017/0193325 | A1* | 7/2017 | Duong | G06K 9/4671 |
| 2017/0201763 | A1* | 7/2017 | Kumar | G06T 1/005 |
| 2017/0214682 | A1* | 7/2017 | Yano | G06F 9/45533 |
| 2018/0007059 | A1* | 1/2018 | Innes | G06F 21/33 |
| 2018/0176299 | A1* | 6/2018 | Kelly | H04L 67/1095 |
| 2018/0247694 | A1* | 8/2018 | Wickeraad | G11C 15/00 |
| 2018/0262559 | A1* | 9/2018 | Arya | G06F 9/505 |
| 2018/0278611 | A1* | 9/2018 | Tan | G06F 9/544 |
| 2018/0357088 | A1* | 12/2018 | Inbaraj | G06F 9/45558 |
| 2019/0014018 | A1* | 1/2019 | Ramalingam | H04L 43/04 |

OTHER PUBLICATIONS

Schmidt et al., The Interactive Performance of SLIM: a Stateless, thin-client Architecture, ACM 1999, pp. 32-47. (Year: 1999).*

Plagemann et al., Modules as Building Blocks for Protocol Configuration, IEEE 1993, pp. 106-113. (Year: 1993).*

Deboosere et al., Cloud-Based desktop Services for Thin Clients, IEEE 2012, pp. 60-67. (Year: 2012).*

Kosta ey al., ThinkAir: Dynamic Resource Allocation and Parallel Execution in the Cloud for Mobile Code Offloading, IEEE 2012, pp. 945-953. (Year: 2012).*

VMware, Inc., "View Architecture Planning," VMware Horizon 7 7.0, 2016, pp. 23-27.

* cited by examiner

| Application | Protocol | Protocol Config |
|---|---|---|
| Word | PCoIP ▼ | Profile 1 ▼ |
| Media Player | Blast ▼ | Profile 3 ▼ |

[ OK ]   [ Cancel ]

ADAPTING REMOTE DISPLAY PROTOCOLS TO REMOTE APPLICATIONS

BACKGROUND

In virtual desktop infrastructures (VDIs), virtual applications hosted on virtual machines (VMs) running on centralized servers are delivered to end users over a network. Such centralized and automated management of the virtualized operating system, applications, and user data provides increased control and cost savings. The remote virtual applications can be accessed by means of a client, for example a native application on an operating system, or from a web client within a browser.

The remote applications can be delivered to the client using one of a number of different remote display protocols that encode, encrypt and transport display information from server to client according to a set of data transfer rules. Such protocols include PCoIP, Blast, as well as many others. Traditionally, the choice of protocol for a particular application was left to the user. However, as different protocols are better at handling different types of applications, this can lead to an inefficient use of computing resources. Moreover, the user may not be familiar with the protocols and may not know which one to choose. Furthermore, remote display protocols are configurable with further options that can affect the remote application. Accordingly, there is a need for a method of automatically selecting and configuring an appropriate remote display protocol for a particular remote application.

SUMMARY

One embodiment disclosed herein provides a computer-implemented method of connecting to a remote virtual application. The method includes the steps carried out at a remote desktop client. The steps include transmitting a request for virtual application connection information, receiving, in response to the request, a path to an executable file, a name or identifier of a remote display protocol, and an indication of a protocol configuration associated with a first virtual application, and causing the executable file for the first virtual application to be launched in a virtual computing instance (e.g., a virtual machine or a container) and accessing the first virtual application using the remote display protocol and the protocol configuration.

Further embodiments of the present invention include computer systems configured to carry out the above methods, and non-transitory computer-readable storage media comprising instructions that cause the computer system to carry out the above methods.

BRIEF DESCRIPTION OF THE DRAWINGS

FIG. 3 illustrates a user interface screen according to an embodiment.

DETAILED DESCRIPTION

Figure 1:
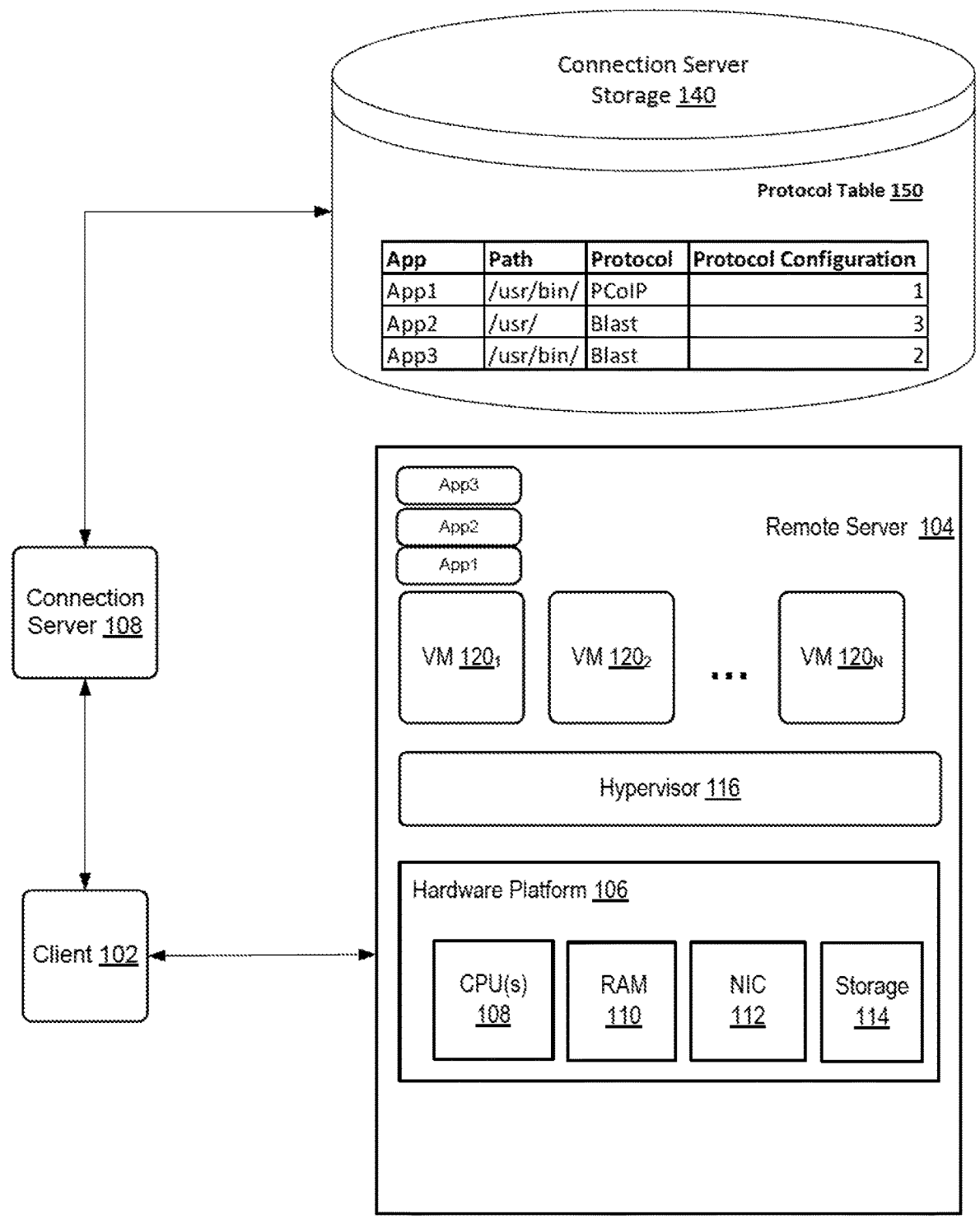
FIG. 1 is a block diagram of a computing system in which one or more embodiments of the present disclosure may be utilized.

FIG. 1 illustrates components of a computing system 100 in which one or more embodiments may be implemented.

Remote desktop client 102 is a software component or module that runs on an operating system of a local computing device. Client 102 can be configured as a native application or else configured to run as a web client. Client 102 provides an interface for a user to access remote applications App1-App3, which are running in one of virtual machines $120_{1-N}$ instantiated on a server that is remote from the user location. Through client 102, the user can access the remote applications from any location, using, e.g., a general purpose computer running a commodity operating system. An example of client 102 is VMware Horizon® View HTML Access, available commercially from VMware Inc., of Palo Alto, Calif.

Computing system 100 includes a connection server 108 that manages connections between client 102 and a particular one of virtual machines $120_{1-N}$ running within a remote server 104. In some embodiments, connection server 108 is configured to authenticate the access to the VM by client 102. Connection server 108 is further coupled to connection server storage 140, which has a protocol table 150 stored therein. Protocol table 150 comprises one or more entries corresponding to each application available to the client 102 from remote server 104. Each entry in protocol table comprises the name or identifier of an application, the path to the executable of the application, the name or identifier of the recommended protocol for the application, and an indication of the recommended protocol configuration for the application.

Remote server 104 can be constructed on a hardware platform 106, for example an x86 server platform. As shown, hardware platform 106 of remote server 104 includes conventional components of a computing device, such as one or more processors (CPUs) 108, random access memory (RAM) 110, a network interface controller (NIC) 112, and storage 114. Storage 114 represents local storage devices (e.g., one or more hard disks, flash memory modules, solid state disks, and optical disks) and/or a storage interface that enables remote server 104 to communicate with one or more network data storage systems. Examples of a storage interface are a host bus adapter (HBA) that couples remote server 104 to one or more storage arrays, such as a storage area network (SAN) or a network-attached storage (NAS), as well as other network data storage systems.

Remote server 104 includes a virtualization software layer, e.g, hypervisor 116, that abstracts processor, memory, storage, and networking resources of hardware platform 106 to support execution of virtual machines $120_1$ to $120_N$ (collectively referred to as VMs 120) that run concurrently on the same remote servers. Hypervisor 116 enables sharing of the hardware resources of remote server 104 by VMs 120. Hypervisor 116 may run on top of the operating system of remote server 104 or directly on hardware components of remote server 104 (i.e. a bare-metal hypervisor).

When client 102 is accessing a remote application using a remote desktop protocol, the graphical user interface (GUI) of the remote application is generated by the VM running on remote server 104 to which client 102 is connected (hereinafter referred to as "the remote VM"). The GUI image data is then encoded and transmitted to client 102, where it is decoded and displayed to the user. Similarly, any user input information, such as keyboard and mouse events, is transmitted from the client 102 to the remote VM, where it may in turn cause various updates to the GUI of the remote desktop. In this manner, the user is able to view the GUI of the remote application and interact with it as if the application was actually running on the host device of client 102 even though the application is actually executing remotely.

Client 102 can access applications running in the remote VM using one of the many available remote display protocols. A remote display protocol is a set of rules that govern the encoding and data transfer between a client and a server. Remote display protocols include Blast™, PCoIP™, RemoteFX®, Remote Desktop Protocol (RDP), Remote Frame Buffer Protocol (RFB), HDX (a remote display protocol from Citrix Systems, Inc.), and others. Because of the network bandwidth and latency limitations, the choice of protocol for a given remote application can present a number of challenges that impact the end user experience. For example, certain protocols such as Blast™ are more suited to high-bandwidth applications such as streaming video applications, whereas protocols such as PCoIP™ are better suited to low-bandwidth applications such as word processing applications.

Figure 2:
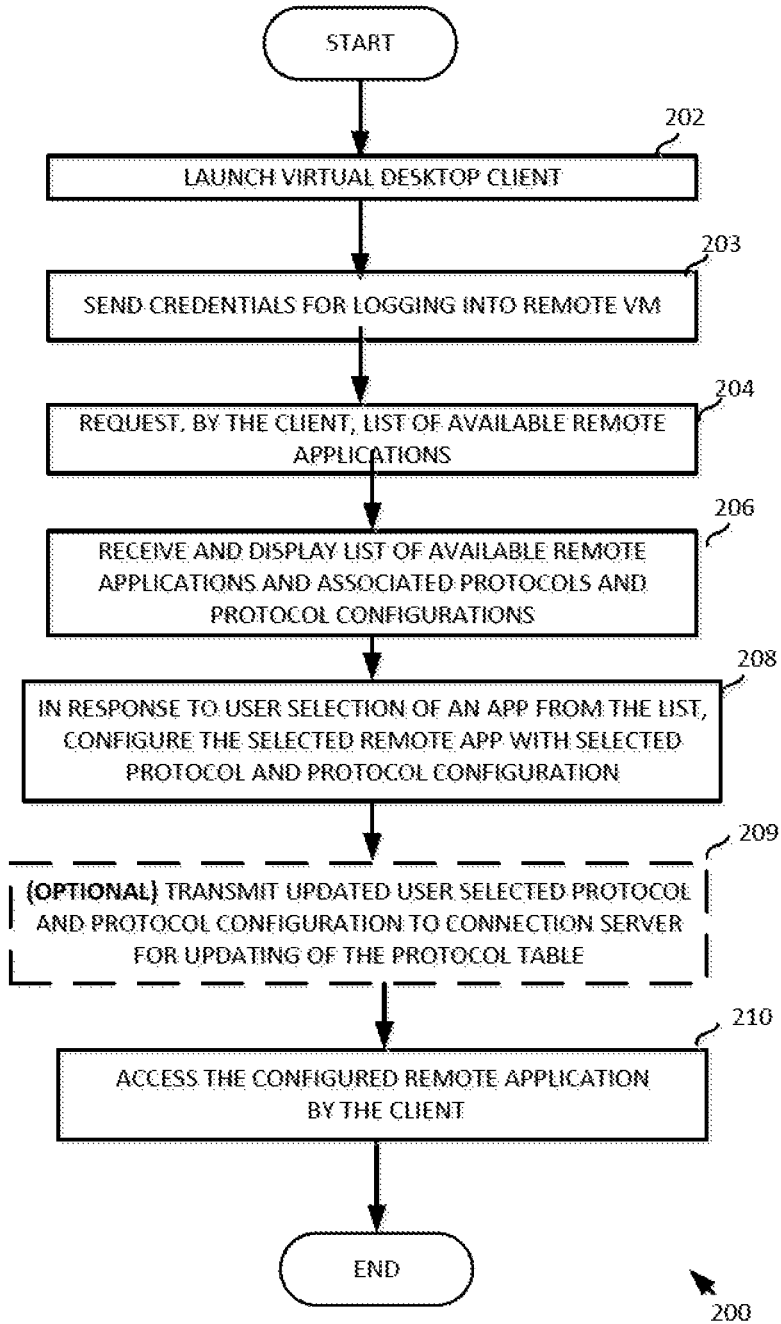
FIG. 2 illustrates a method of connecting to a remote application, according to an embodiment.

FIG. 2 illustrates a method 200 of accessing a remote application, according to an embodiment. As shown, method 200 begins at step 202 where client 102 is launched by a user. At step 203, client 102 gathers credentials from the user and sends them to the connection server 108 in order to log into remote VM 120. At step 204, client 102 then sends a request to connection server 108 for a list of available applications, and their file paths and protocol information.

At step 206, client 102 receives the requested information from the connection server 108. The protocol information includes a name or identifier of a protocol and an indication of a protocol configuration. The protocol is the remote display protocol that is recommended for the particular application by the system administrator and the protocol configuration comprises one or more configuration settings for a particular protocol. For example, the Blast™ protocol can be configured with a "low bandwidth" setting or a "high-bandwidth" setting, and the PCoIP™ protocol can be configured with a "maximum FPS (frames per second)" setting. In one embodiment, for each application in the list, only the name or identifier of the recommended protocol and the indication of the recommended protocol configuration are returned to client 102. In another embodiment, different protocols and protocol configurations are presented in a drop-down menu for selection by the user, as shown in FIG. 3. The recommended protocol and the protocol configuration are presented as default choices that may be modified by the user, for example by using the drop-down menu. At step 208, in response to a selection of an application by a user, the remote application is configured for use with the protocol and the protocol configuration as selected by the user. In some embodiments, at optional step 209, the user selections of protocol and protocol configuration are transmitted to connection server 108 and stored in protocol table 150 so that, upon a subsequent launch of any of the applications in the list by the user, client 102 will access the application using the stored protocol and protocol configuration. At step 210 the remote application is accessed by client 102.

Figure 4:
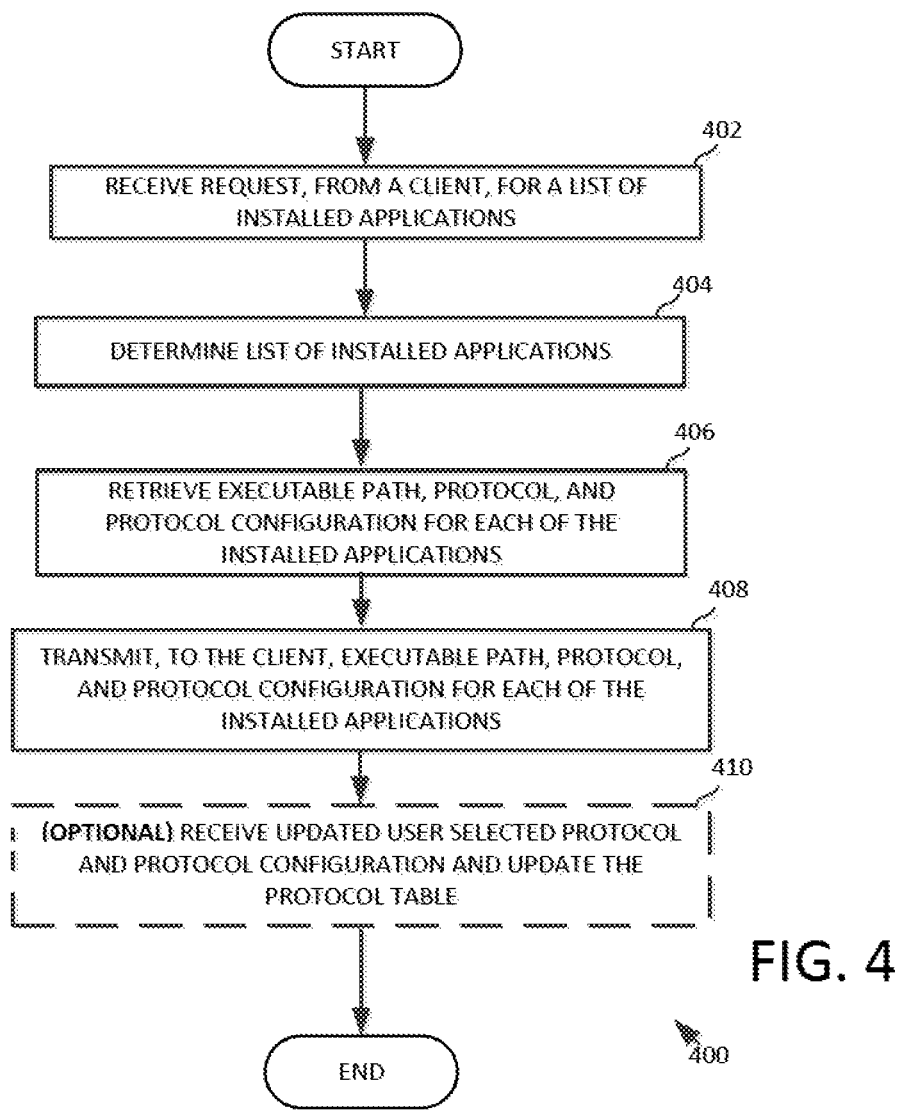
FIG. 4 illustrates a method of connecting a remote desktop client to a remote application, according to an embodiment.

FIG. 4 illustrates a method 400 carried out by connection server 108 in response to a user launching client 102 on a client device. Connection server 108 is a component or server that manages connection from a client 102 to a remote server 104. Connection server 108 is configured to authenticate requests from client 102 and determine what applications are available to client 102 on a particular VM 120, as well as the recommended protocol and protocol configuration for each of the applications.

Method 400 begins at step 402, where connection server 108 receives a request from a client 102 for a list of installed applications, and their file paths and protocol information. At step 404, connection server 108 accesses protocol table 150 located on connection server storage 140 to determine a list of installed applications of client 102. At step 406, for each application in the list of installed applications, connection server 108 determines the file path, the protocol, and the protocol configuration. At step 408, connection server 108 transmits to client 102 the list of applications, and for each application, the executable path, the name or identifier of the protocol, and the indication of the protocol configuration to the requesting client 102.

Protocol table 150 is updated each time a new application is installed at client 102 and other clients whose connections to remote desktops are managed by connection server 108. For each application, the entry for that application in protocol table 150 is populated with the name or identifier of default protocol and the indication of the protocol configurations for that application. In addition, if the user selects a different protocol or protocol configuration for a virtual application that is different from the default one, protocol table 150 is updated in accordance with the user's selection. This update is shown as an optional step 410 in FIG. 4.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of accessing virtual applications executing within a virtual machine hosted on a remote server, comprising:
   transmitting, by a remote desktop client to a server, a request for virtual application connection information;
   receiving, by the remote desktop client from the server, in response to the request, a path to an executable file, an identifier of a remote display protocol, and an indication of a protocol configuration, associated with a first virtual application; and
   causing the executable file for the first virtual application to be launched in the virtual machine and accessing the first virtual application using the remote display protocol and the protocol configuration associated with the first virtual application.

2. The method of claim 1, further comprising:
   receiving, by the remote desktop client, a path to an executable file, an identifier of a remote display protocol, and an indication of a protocol configuration, associated with a second virtual application;
   displaying, by the remote desktop client, default selections corresponding to the remote display protocol and the protocol configuration, associated with the second virtual application, in corresponding drop-down menus; and
   causing the executable file for the second virtual application to be launched in the virtual machine and accessing the second virtual application using the remote display protocol and the protocol configuration, as selected in the drop-down menus.

3. The method of claim 2, further comprising transmitting authentication credentials for logging into the virtual machine.

4. The method of claim 1, wherein the remote display protocol associated with the first virtual application is one of Blast, PCoIP, RemoteFX, and HDX.

5. The method of claim 4, wherein the protocol configuration associated with the first virtual application comprises one or more configuration settings for the remote display protocol associated with the first virtual application.

6. The method of claim 1, wherein the remote display protocol and the protocol configuration for the first virtual application are modifiable by a user.

7. The method of claim 6, wherein the path to the executable file, the identifier of a remote display protocol, and the indication of the protocol configuration associated with the first virtual application are stored in a protocol table, and the protocol table is updated in accordance with modifications made by the user.

8. A method of providing access to a virtual application executing within a virtual machine hosted on a remote server, comprising:
- receiving, from a remote desktop client at a connection server, a request for virtual application connection information;
- determining, by the connection server, a path to an executable file, a remote display protocol, and a protocol configuration, associated with a first virtual application; and
- transmitting, by the connection server to the remote desktop client, the path to the executable file, an identifier of the remote display protocol, and an indication of the protocol configuration, associated with the first virtual application.

9. The method of claim 8, further comprising:
- determining, by the connection server, a path to an executable file, a remote display protocol, and a protocol configuration, associated with a second virtual application; and
- transmitting, by the connection server to the remote desktop client, the path to the executable file, an identifier of the remote display protocol, and an indication of the protocol configuration, associated with the second virtual application.

10. The method of claim 9, further comprising verifying received authentication credentials for logging into the virtual machine.

11. The method of claim 8, wherein the remote display protocol is one of Blast, PCoIP, RemoteFX, and HDX.

12. The method of claim 11, wherein the protocol configuration comprises one or more configuration settings for the remote display protocol.

13. The method of claim 8, wherein the remote display protocol and the protocol configuration are modifiable by a user.

14. The method of claim 13, wherein the path to the executable file, the identifier of the remote display protocol, and the indication of the protocol configuration associated with the first virtual application are stored in a protocol table, and the protocol table is updated in accordance with modifications made by the user.

15. A virtualized desktop infrastructure system comprising:
- a remote desktop client;
- a connection server; and
- a remote server,
- wherein the remote desktop client is configured to:
  - transmit, to the connection server, a request for virtual application information, wherein a first virtual application is executing within a virtual machine hosted on the remote server;
  - receive, in response to the request, from the connection server, a path to an executable file, an identifier of a remote display protocol, and an indication of a protocol configuration, associated with the first virtual application;
- wherein the connection server is configured to:
  - receive the request for virtual application information;
  - determine the path to the executable file, the remote display protocol, and the protocol configuration, associated with the first virtual application; and
  - transmit, to the remote desktop client, the path to the executable file, the identifier of the remote display protocol, and the indication of the protocol configuration, associated with the first virtual application; and
- wherein the remote server is configured to cause the first virtual application to be launched in the virtual machine hosted thereon.

16. The virtualized desktop infrastructure system of claim 15, wherein the remote desktop client is further configured to:
- receive a path to an executable file, an identifier of a remote display protocol, and an indication of a protocol configuration, associated with a second virtual application;
- display default selections corresponding to the remote display protocol and the protocol configuration, associated with the second virtual application, in corresponding drop-down menus; and
- cause the executable file for the second virtual application to be launched in the virtual machine and access the second virtual application using the remote display protocol and the protocol configuration, as selected in the drop-down menus.

17. The virtualized desktop infrastructure system of claim 16, wherein the remote desktop client is further configured to transmit authentication credentials for logging into the virtual machine.

18. The virtualized desktop infrastructure system of claim 15, wherein the path to the executable file, the identifier of the remote display protocol, and the indication of the protocol configuration associated with the first virtual application are stored in a protocol table, and the protocol table is updated in accordance with modifications made by the user.

19. The virtualized desktop infrastructure system of claim 15, wherein the remote display protocol is one of Blast, PCoIP, RemoteFX, and HDX.

20. The virtualized desktop infrastructure system of claim 19, wherein the protocol configuration comprises one or more configuration settings for the remote display protocol.

* * * * *